(12) United States Patent
Yao et al.

(10) Patent No.: US 7,399,885 B2
(45) Date of Patent: Jul. 15, 2008

(54) METHOD FOR PREPARING HYDROXYLAMINE

(75) Inventors: Pin-To Yao, Taipei (TW); Cheng-Fa Hsieh, Taipei (TW); Ren-Hao Hsu, Taipei (TW)

(73) Assignee: China Petrochemical Development Corporation, Taipei (TW)

( * ) Notice: Subject to any disclaimer, the term of this patent is extended or adjusted under 35 U.S.C. 154(b) by 0 days.

(21) Appl. No.: 11/712,690

(22) Filed: Feb. 28, 2007

(65) Prior Publication Data

US 2007/0265471 A1    Nov. 15, 2007

(30) Foreign Application Priority Data

Apr. 11, 2006    (TW) .............................. 95112787 A

(51) Int. Cl.
*C07C 239/08* (2006.01)
(52) U.S. Cl. ...................................... 564/300; 564/301
(58) Field of Classification Search ........................ None
See application file for complete search history.

(56) References Cited

U.S. PATENT DOCUMENTS 3,767,758 A    10/1973    Mars et al.
4,062,927 A    12/1977    De Rooij et al.

OTHER PUBLICATIONS

Database Caplus on Stn, Acc. No. 1972:5425, Duyverman et al., DE 2114806 A (Oct. 14, 1971) (abstract).*
Database Caplus on Stn, Acc. No. 1999:538142, Watzenberger et al., DE 19806578 (Aug. 19, 1999) (abstract).*
Database Caplus on Stn, Acc. No. 1977:503934, De Rooij et al., NL 7507119 (Dec. 20, 1976) (abstract).*

* cited by examiner

*Primary Examiner*—Brian J Davis
(74) *Attorney, Agent, or Firm*—Edwards Angell Palmer & Dodge LLP; Peter F. Corless; Dwight D. Kim

(57) ABSTRACT

A method for preparing hydroxylamine, comprising the steps of: (i) pretreating the acidic buffer solution with the compounds having a functional group represented by formula (I), thereby removing metal impurities from the acidic buffer solution; and (ii) reducing nitrate ions in the acidic buffer solution with hydrogen to give hydroxylamine in the presence of catalysts,

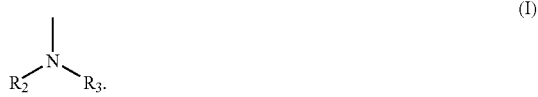

According to the present invention the selectivity for reducing nitrate ions to give hydroxylamine can be significantly enhanced.

10 Claims, No Drawings

METHOD FOR PREPARING HYDROXYLAMINE

FIELD OF THE INVENTION

The present invention relates to a method for preparing hydroxylamine, and more particularly, to a method for preparing hydroxylamine by reduction of nitrate ions with hydrogen.

BACKGROUND OF THE INVENTION

Industrial preparation of hyroxylamine is usually carried out under a recycling system by combining with other processes, for example, the hydroxylamine-oxime reaction system. In this system, nitric acid and hydrogen are used as starting material, and phosphate salt is used as an inorganic processing solution. Nitrate ions are then reduced to hydroxylamine in the presence of catalysts. The hydroxylamine obtained is subjected to a condensation reaction with cyclohexanone to yield cyclohexanone oxime. After oxime is produced, nitric acid is added to the phosphate processing solution or nitrous gases is introduced and absorbed to form nitric acid, so as to increase the required amount of nitrate ions. Thereafter, the phosphate inorganic processing solution is introduced to a hydroxylamine reactor to generate hydroxylamine. These reactions are shown as follows:

Preparation of Hydroxylammonium Phosphate by the Reduction Nitrate Ions

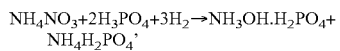

NH$_4$NO$_3$+2H$_3$PO$_4$+3H$_2$→NH$_3$OH.H$_2$PO$_4$+ NH$_4$H$_2$PO$_4$,

Preparation of Cyclohexanone Oxime by Condensation with Cyclohexanone

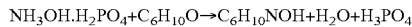

NH$_3$OH.H$_2$PO$_4$+C$_6$H$_{10}$O→C$_6$H$_{10}$NOH+H$_2$O+H$_3$PO$_4$

Supplement of Nitrate Ions into the Phosphate Inorganic Processing Solution

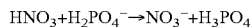

HNO$_3$+H$_2$PO$_4^-$→NO$_3^-$+H$_3$PO$_4$

Since the inorganic processing solution containing phosphate salt is recycled during the processing, the quality of the obtained hydroxylamine is directly affected by the quality of the inorganic processing solution. In the inorganic processing solution, phosphate salt is used as an acidic buffer solution. The acidic buffer solution will corrode and dissolve the metal materials apparatuses or facilities and form the metal impurities. The metal of the impurities then decrease the selectivity of hydroxylamine production. For example, U.S. Pat. No. 3,767,758 describes that an inorganic processing solution containing molybdenum, rhodium or ruthenium causes a decrease of the selectivity of hydroxylamine production. Further, U.S. Pat. No. 4,062,927 discloses that when hydroxylamine is prepared by reduction of nitrate ions or nitrogen monoxide with hydrogen in an acidic solution, the acidic solution can corrode apparatuses or facilities, and thus causes the contamination with heavy metal. Among the heavy metal contaminants, molybdenum contaminants can cause 5~15% decrease of the selectivity of hydroxylamine production. Therefore, the molybdenum contaminants are removed from the acidic solution by coprecipitation of the molybdenum contaminants together with the ion-ammonium phosphate precipitate.

However, the coprecipitation requires a pH of over 3.5 to give precipitates, and a basic solution is required to adjust the pH of the acidic inorganic processing solution used in the hydroxylamine-oxime recycling system. However, this treatment will increase the costs and the complexity of the processes and the selectivity of the hydroxylamine production is only promoted up to 83%.

Therefore, it is desirable to provide a simple process with high selectivity for the preparation of hydroxylamine.

SUMMARY OF THE INVENTION

To overcome the above-mentioned problems of the prior art, one object of this invention is to provide a method for preparing hydroxylamine with a high selectivity of hydroxylamine production.

To achieve the aforementioned and other objects, the present invention provides a method for preparing hydroxylamine that comprises the steps of: (i) pretreating the acid buffer solution with the compounds having a functional group represented by formula (I),

(I)

wherein, R$_2$ and R$_3$ are as defined below; and (ii) reducing nitrate ions in the acidic buffer solution with hydrogen to yield hydroxylamine in the presence of catalysts. Because the acidic buffer solution used for the hydroxylamine preparation is pretreated to remove metal impurities, the selectivity of the hydroxylamine production significantly increased.

DETAILED DESCRIPTION OF THE PREFERED EMBODIMENTS

The following embodiments are provided to illustrate the disclosures of the present invention. These and other advantages and effects can be apparently understood by those skilled in the art after reading this specification. The present invention can also be performed or applied by other different embodiments. The details of the specification may be modified and varied on the basis of different points and applications without departing from the spirit of the present invention.

In the present invention, nitrate ions in a pretreated acidic buffer solution are reduced to hydroxylamine with hydrogen in the presence of catalysts. The acidic buffer solution includes an acidic buffer, nitric acid or nitrate salts, and metal impurities. Examples of the acidic buffer include, for example, sulfuric acid, phosphoric acid, and salts thereof.

In one embodiment of the present invention, the phosphate inorganic processing solution in the hydroxylamine-oxime recycling system is used as the acidic buffer solution for synthesizing hydroxylammoniun phosphate. The acidic buffer solution comprises, based on weight of the whole acidic buffer solution, about 0.15 to 0.18 wt % of hydrogen ions, about 21.4 to 23.7 wt % of phosphate ions, about 4.6 to 5.3 wt % of ammonium ions, about 0.033 to 0.16 wt % of hydroxylammonium ions, about 8.6 to 10.7 wt % of nitrate ions, and tens ppb tens ppm of copper and nickel impurities.

Because the metal impurities in the acidic buffer solution can decrease the selectivity of hydroxylamine production, a pretreatment must be performed to remove the metal impurities. As used herein, the selectivity of the hydroxylamine is defined as follows:

The selectivity of hydroxylamine production=2×(the yield of hydroxylamine)/the consumption of hydrogen ions×100%.

In the present invention, metal impurities are separated from the acidic buffer solution by treating with the compounds having a functional group represented by formula (I),

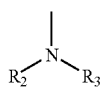
(I)

wherein $R_2$ and $R_3$ are, independently, those selected from the group consisting of hydrogen atom, phenyl, phenyl substituted by $C_{1-6}$ alkyl, phenyl substituted by nitro group, phenyl substituted by amino group, phenyl substituted by halogen, heteroaryl having 1 to 3 heteroatoms, $XR_4$, and polymers, wherein the heteroatom is selected from the group consisting of N, O and S atoms; the heteroaryl is aryl having 6 to 18 carbons; X is chemical bond or alkylene having 1 to 6 carbons; $R_4$ is selected from the group consisting of hydrogen, phenyl, heteroaryl having 1 to 3 heteroatoms, and polymers; and at least one of $R_2$, and $R_3$ is not hydrogen. Preferably, the polymer is polystyrene-divinylbenzene copolymer, $R_2$ and $R_3$ are $XR_4$, and X is methylene, and $R_4$ is pyridyl.

In this embodiment, the pretreatment of the acidic buffer solution is carried out by flowing through a resin bed having a functional group represented by formula (I). The flowing rate is usually in the range between 0.1 to 40 bed volume (BV)/hour, preferably in the range between 0.1 to 12 BV/hour, more preferably in the range between 0.5 to 4 BV/hour, and furthermore preferably in the range between 1 to 3.5 BV/hour. The pretreatment may be carried out at a temperature of 0° C. to 50° C., preferably 10° C. to 40° C., and more preferably 10° C. to 25° C., but it is not limited to those.

In this embodiment, the phosphate inorganic processing solution in the hydroxylamine-oxime recycling system is used as the acidic buffer solution for preparing hydroxylammonium phosphate. Accordingly, nitrate ions are supplemented to the pretreated acidic buffer solution before performing the hydroxylamine synthesis. The amount of nitrate ions in the acidic buffer solution is preferably adjusted to 13 to 18 wt %, and more preferably adjusted to 14 to 16.5 wt %.

In the present invention, the condition for synthesizing hydroxylamine is not specially restricted, and those conditions for reducing nitrate ions with hydrogen are all suitable. For example, reaction temperature may be from 20° C. to 100° C., preferably from 30° C. to 90° C., and more preferably from 40° C. to 65° C.; and reaction pressure may be from 10 to 30 kg/cm², preferably from 18 to 26 kg/cm², and more preferably from 18 to 24 kg/cm². Examples of catalysts used in the hydroxylamine synthesis include, but not limited to, noble metal catalysts such as palladium and palladium-platinium catalysts on $GeO_2$. Examples of carriers of the catalysts include, but not limited to, carbon and aluminum oxide. Content of the noble metal catalysts is usually, based on weight of the whole carriers and catalysts, between 1 and 25 wt %, preferably between 5 and 15 wt %. Content of catalysts used for hydroxylamine synthesis is usually, based on weight of the whole acidic buffer solution, between 0.2 and 5 wt %.

In the present invention, a pretreated acidic buffer solution is used for hydroxylamine synthesis, and the selectivity of the hydroxylamine production can be significantly enhanced.

EXAMPLES

Example 1

A phosphate inorganic processing solution in a hydroxylamine-oxime recycling system was used as an acidic buffer solution for preparing hydroxylammonium phosphate. The composition of the phosphate inorganic solution was analyzed by titration. The content of metals in the phosphate inorganic processing solution was determined by inductively coupled plasma optical emission spectrometry (ICP-OES).

The results are shown in Table 1.

Then, the phosphate inorganic processing solution was pretreated by passing through a resin bed with a functional group represented by formula (II) at a flow rate of 2 BV/hr,

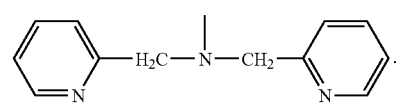
(II)

After the pretreatment, a step of absorbing nitric acid was performed. After absorbing nitric acid, the composition of the phosphate inorganic processing solution was analyzed. The results are shown in Table 1.

TABLE 1

| | $H^+$ | $H_2PO_4^-$ | $NH_4^+$ | $NH_3OH^+$ | $NO_3^-$ |
|---|---|---|---|---|---|
| Composition of inorganic processing solution before pretreatment (wt %) | 0.165 | 22.45 | 5.14 | 0.108 | 10.55 |
| Content of metals in inorganic processing solution before pretreatment | | Cu: 2 ppm, Ni: 42.3 ppm | | | |
| Composition of inorganic processing solution after absorbing nitric acid (wt %) | 0.295 | 20.6 | 4.15 | 0.078 | 15.2 |

Thereafter, hydrogen and nitrogen were introduced into the phosphate inorganic processing solution at 50° C. under the pressure of 24 kg/cm² in the presence of catalysts. Hydroxylammonium phosphate was obtained. The selectivity for reducing nitrate ions to give hydroxylamine is 91.20%.

Example 2

A phosphate inorganic processing solution in a hydroxylamine-oxime recycling system was used as an acidic buffer solution for preparing hydroxylammonium phosphate. The composition of the phosphate inorganic solution was analyzed by titration. The content of metals in the phosphate inorganic processing solution was determined by ICP-OES. The results are shown in Table 2.

Then, the phosphate inorganic processing solution was pretreated by passing through a resin bed with a functional group represented by formula (II) at a flow rate of 2 BV/hr,

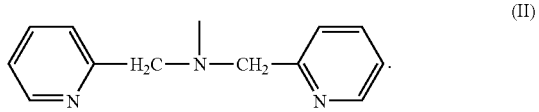

(II)

After the pretreatment, a step of absorbing nitric acid was performed. After absorbing nitric acid, the composition of the phosphate inorganic processing solution was analyzed. The results are shown in Table 2.

TABLE 2

| | $H^+$ | $H_2PO_4^-$ | $NH_4^+$ | $NH_3OH^+$ | $NO_3^-$ |
|---|---|---|---|---|---|
| Composition of inorganic processing solution before pretreatment (wt %) | 0.163 | 22.39 | 5.19 | 0.109 | 10.59 |
| Content of metals in inorganic processing solution before pretreatment | | Cu: 5 ppm, Ni: 42.5 ppm | | | |
| Composition of inorganic processing solution after absorbing nitric acid (wt %) | 0.293 | 20.8 | 4.21 | 0.078 | 15.36 |

Thereafter, hydrogen and nitrogen were introduced into the phosphate inorganic processing solution at 50° C. under the pressure of 24 kg/cm² in the presence of catalysts. Hydroxylammonium phosphate was obtained. The selectivity for reducing nitrate ions to give hydroxylamine is 91.8%.

Comparative Example 1

A phosphate inorganic processing solution in a hydroxylamine-oxime recycling system was used as an acidic buffer solution for preparing hydroxylammonium phosphate. The composition of the phosphate inorganic solution was analyzed by titration. The content of metals in the phosphate inorganic processing solution was determined by ICP-OES. The results are shown in Table 3. Then, a step of absorbing nitric acid was performed. After absorbing nitric acid, the composition of the phosphate inorganic processing solution was analyzed. The results are shown in Table 3.

TABLE 3

| | $H^+$ | $H_2PO_4^-$ | $NH_4^+$ | $NH_3OH^+$ | $NO_3^-$ |
|---|---|---|---|---|---|
| Composition of inorganic processing solution without pretreatment (wt %) | 0.168 | 22.42 | 5.16 | 0.107 | 10.61 |
| Content of metal in inorganic processing solution without pretreatment | | Cu: 60 ppb, Ni: 42.3 ppm | | | |
| Composition of inorganic processing solution after absorbing nitric acid (wt %) | 0.293 | 20.52 | 4.17 | 0.075 | 15.63 |

Thereafter, hydrogen and nitrogen were introduced into the phosphate inorganic processing solution at 50° C. under the pressure of 24 kg/cm² in the presence of catalysts. Hydroxylammonium phosphate was obtained. The selectivity for reducing nitrate ions to give hydroxylamine is 85.58%.

Comparative Example 2

A phosphate inorganic processing solution in a hydroxylamine-oxime recycling system was used as an acidic buffer solution for preparing hydroxylammonium phosphate. The composition of the phosphate inorganic solution was analyzed by titration. The content of metals in the phosphate inorganic processing solution was determined by ICP-OES. The results are shown in Table 4.

Then, a step of absorbing nitric acid was performed. After absorbing nitric acid the composition of the phosphate inorganic processing solution was analyzed. The results are shown in Table 4.

TABLE 4

| | $H^+$ | $H_2PO_4^-$ | $NH_4^+$ | $NH_3OH^+$ | $NO_3^-$ |
|---|---|---|---|---|---|
| Composition of inorganic processing solution without pretreatment (wt %) | 0.165 | 22.46 | 5.16 | 0.109 | 10.61 |
| Content of metal in inorganic processing solution without pretreatment | | Cu: 2 ppm, Ni: 42.3 ppm | | | |
| Composition of inorganic processing solution after absorbing nitric acid (wt %) | 0.294 | 20.8 | 4.12 | 0.079 | 15.28 |

Thereafter, hydrogen and nitrogen were introduced into the phosphate inorganic processing solution at 50° C. under the pressure of 24 kg/cm² in the presence of catalysts. Hydroxylammonium phosphate was obtained. The selectivity for reducing nitrate ions to give hydroxylamine is 76.49%.

Comparative Example 3

A phosphate inorganic processing solution in a hydroxylamine-oxime recycling system was used as an acidic buffer solution for preparing hydroxylammonium phosphate. The composition of the phosphate inorganic solution was analyzed by titration. The content of metals in the phosphate inorganic processing solution was determined by ICP-OES. The results are shown in Table 5.

Then, a step of absorbing nitric acid was performed. After absorbing nitric acid, the composition of the phosphate inorganic processing solution was analyzed. The results are shown in Table 5.

TABLE 5

| | $H^+$ | $H_2PO_4^-$ | $NH_4^+$ | $NH_3OH^+$ | $NO_3^-$ |
|---|---|---|---|---|---|
| Composition of inorganic processing solution without pretreatment (wt %) | 0.168 | 22.39 | 5.18 | 0.109 | 10.66 |
| Content of metals in inorganic processing solution without pretreatment | | Cu: 5 ppm, Ni: 42.5 ppm | | | |
| Composition of inorganic processing solution after absorbing nitric acid (wt %) | 0.294 | 20.85 | 4.18 | 0.075 | 15.24 |

Thereafter, hydrogen and nitrogen were introduced into the phosphate inorganic processing solution at 50° C. under the pressure of 24 kg/cm² in the presence of catalysts. Hydroxylammonium phosphate was obtained. The selectivity for reducing nitrate ions to give hydroxylamine is 51.33%.

According to the results of the examples and the comparative examples, it is found that the method of the present invention can effectively eliminate metal impurities of copper, nickel and the like from the acidic buffer solution prior to the synthesis of hydroxylamine, thereby the selectivity for hydroxylamine production is obviously promoted.

The foregoing detailed descriptions of the embodiments have been discussed for illustrating the features and functions of the present invention and not for limiting the scope of the present invention. Those skilled in the art will appreciate that modifications and variations according to the spirit and principle of the present invention may be made. All such modifications and variations are considered to fall within the spirit and scope of the present invention as defined by the claims of the present invention.

What is claimed is:

1. A method for preparing hydroxylamine, comprising the steps of:
   (i) pretreating an acidic buffer solution comprising acidic buffer reagents, nitric acid or nitrate salts, and metal impurities, with the compounds having a functional group represented by formula (I),

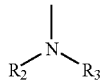

wherein $R_2$ and $R_3$ are, independently, those selected from the group consisting of hydrogen atom, phenyl, phenyl substituted by $C_{1-6}$ alkyl, phenyl substituted by nitro group, phenyl substituted by amino group, phenyl substituted by halogen, heteroaryl having 1 to 3 heteroatoms, —$XR_4$, and polymers; of those, the heteroatom is selected from the group consisting of N, O and S atoms, the heteroaryl is aryl having 6 to 18 carbons, X is a chemical bond or alkylene having 1 to 6 carbons; $R_4$ is selected from the group consisting of hydrogen atom, phenyl, heteroaryl having 1 to 3 heteroatoms, and polymers, and at least one of $R_2$, and $R_3$ is not hydrogen; and
   (ii) reducing nitrate ions in the acidic buffer solution with hydrogen to give hydroxylamine in the presence of catalysts.

2. The method according to claim 1, wherein the polymer is polystyrene-divinylbenzene copolymer.

3. The method according to claim 1, wherein $R_2$ and $R_3$ are —$XR_4$, X is methylene, and $R_4$ is pyridyl.

4. The method according to claim 1, wherein the acidic buffer solution is pretreated at a temperature of 0° C. to 50° C.

5. The method according to claim 4, wherein the acidic buffer solution is pretreated at a temperature of 10° C. to 40° C.

6. The method according to claim 5, wherein the acidic buffer solution is pretreated at a temperature of 10° C. to 25° C.

7. The method according to claim 1, wherein the metal impurities include copper and nickel.

8. The method according to claim 1, wherein the acidic buffer solution is taken from an oxime reaction in cyclohexanone oxime synthesis.

9. The method according to claim 1, further comprising a step of supplementing nitrate ions into the acidic buffer solution before the step (ii) is carried out.

10. The method according to claim 1, wherein the acidic buffer reagent is selected from the group consisting of sulfuric acid, phosphoric acid, and salts thereof.

* * * * *